(12) United States Patent
Brouwer

(10) Patent No.: US 6,276,807 B1
(45) Date of Patent: Aug. 21, 2001

(54) METHOD FOR MOUNTING ADJUSTING MEANS IN A VEHICLE REAR VIEW MIRROR, MOUNTING PLATE USED THEREFOR, AND MIRROR PROVIDED WITH SUCH A MOUNTING PLATE

(75) Inventor: Stefan Frits Brouwer, Den Haag (NL)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/555,167
(22) PCT Filed: Dec. 2, 1998
(86) PCT No.: PCT/NL98/00684
§ 371 Date: Aug. 25, 2000
§ 102(e) Date: Aug. 25, 2000
(87) PCT Pub. No.: WO99/28154
PCT Pub. Date: Jun. 10, 1999

(30) Foreign Application Priority Data

Dec. 2, 1997 (NL) .................................................. 1007676

(51) Int. Cl.[7] .................................................. G02B 7/182
(52) U.S. Cl. .................... 359/871; 359/872; 359/873; 248/476; 248/477
(58) Field of Search ..................................... 359/871, 872, 359/873, 874, 877, 900; 248/476, 477, 479, 487, 486

(56) References Cited

U.S. PATENT DOCUMENTS

| 4,158,483 | * | 6/1979 | Fisher et al. | 350/289 |
| 4,824,232 | * | 4/1989 | Thompson | 350/633 |
| 5,005,797 | * | 4/1991 | Maekawa et al. | 248/479 |
| 5,042,932 | * | 8/1991 | Pent | 359/874 |
| 5,097,362 | * | 3/1992 | Lynas | 359/843 |
| 5,453,915 | * | 9/1995 | Bradley, III | 362/144 |

* cited by examiner

Primary Examiner—Mohammad Sikder
(74) Attorney, Agent, or Firm—Roger A. Johnston

(57) ABSTRACT

In a method for mounting first and second adjusting means for pivoting a mirror element about two mutually substantially perpendicular axes in the housing of a mirror to be secured in or to a vehicle, each of the adjusting means is arranged on a mounting plate member, whereafter, depending on the desired distance between the intersection of the axes and the points of application of the adjusting means on the mirror element, the two mounting plate members are positioned relative to each other and, in the relative position they have thus assumed, are mounted in the housing of a mirror. The two mounting plate members are connected for movement relative to each other in the plane of the mounting plate.

8 Claims, 2 Drawing Sheets

METHOD FOR MOUNTING ADJUSTING MEANS IN A VEHICLE REAR VIEW MIRROR, MOUNTING PLATE USED THEREFOR, AND MIRROR PROVIDED WITH SUCH A MOUNTING PLATE

FIELD OF THE INVENTION

The present invention relates to a method for mounting first and second adjusting means for pivoting a mirror element about two substantially mutually perpendicular axes in a housing of a mirror to be secured in or to a motor vehicle.

SUMMARY OF THE INVENTION

For adjusting a mirror element in a rear-view mirror or wing mirror of a motor vehicle, in particular automobiles and trucks, electric adjusting means have long since been used. These adjusting means act, for pivoting the mirror element about each of the axes, on this mirror element at two relevant points situated at a specific distance from the pivoting point of the mirror element about the two axes. This distance will often be the same for both points of application. The two points of application then determine, together with the pivoting point, an isosceles triangle with an apex angle of 90°, the magnitude of which will depend on the mirror. In particular the magnitude of the legs determines the strength and stability of the attachment of the mirror element in the housing of the mirror. For passenger cars, which often have relatively small mirrors, a shorter leg length is therefore sufficient than for trucks in which another and substantially larger type of mirrors is used and in which the leg length, in order to meet the requirements with respect to strength and stability of the attachment of the mirror element in the housing of the mirror, will therefore be greater. However, this involves additional cost, both regarding the manufacture of the various parts of the mirror and for the assembly of the whole.

The object of the invention is to remove this drawback and to provide a method enabling more standardization in the production of mirrors of different sizes.

According to the invention the method as described in the opening paragraph is characterized in that, using a mounting plate consisting of two parts connected for movement relative to each other in the plane of the mounting plate, each of the adjusting means is arranged on a relevant mounting plate member, whereafter, depending on the desired distance between the intersection of the two mutually perpendicular axes and the points of application of the adjusting means on the mirror element, the two mounting plate members are positioned relative to each other and, in the relative position they have thus assumed, are mounted in the housing of the mirror.

The invention not only relates to a method as described before, but also relates to a mounting plate used for carrying out this method. The mounting plate is then characterized in that it consists of two parts connected for movement relative to each other in the plane of the mounting plate, on which parts respectively first and second adjusting means are arranged for pivoting a mirror element about two substantially mutually perpendicular axes in a housing of a mirror to be secured in or to a vehicle.

Although the adjusting means may be composed in many ways for pivoting the mirror element about the above-mentioned axes through either a movement of rotation or a movement of translation, the mounting plate is preferably of such construction that a motor with associated transmission means is arranged on each mounting plate member, by means of which transmission means a control element can be moved linearly in a direction towards or away from the mounting plate member, the end of which control element, when the mounting plate and the mirror element are arranged in the housing of the mirror, acts on the mirror element. Preference is therefore given to the use of a movement of translation to pivot the mirror element about the axes.

The control element may be a gear rack, while the transmission means may be formed by a suitable combination of gear wheels or by a planetary gearing; however, preference is given to a control element formed by a screw spindle, while each of the transmission means is formed by a worm to be driven by a relevant motor and a worm wheel gearing therewith and moving the screw spindle linearly. The desired transmission ratio is thus simply realized.

The mounting plate according to the invention consists of two parts connected for movement relative to each other in the plane of the mounting plate. This movable connection can be realized in different ways. Thus it is possible that the two mounting plate members are connected together by a deformable connecting piece. However, it is also possible to connect the two mounting plate members together by a loose joint.

The invention further relates to a mirror for a vehicle, comprising a housing to be secured in or to the vehicle, a mirror element arranged therein for pivoting about two substantially mutually perpendicular axes and adjusting means arranged in the housing on a mounting plate, which adjusting means comprise a motor with associated transmission means for pivoting the mirror element about each of the axes. The mirror is then characterized in that the mounting plate consists of two parts connected for movement relative to each other in the plane of the mounting plate, on each part of which is arranged a motor with associated transmission means, the position of the mounting plates relative to each other being determined by the size of the housing of the mirror and the size of the mirror element. More in detail, the mirror is further characterized in that the mirror element comprises a supporting plate arranged in the housing for pivoting about two substantially mutually perpendicular axes, and each of the transmission means comprises a worm to be driven by a relevant motor, as well as a worm wheel gearing with this worm, by which a screw spindle can be moved linearly in a direction towards or away from the mounting plate member, the end of which screw spindle is connected with the supporting plate by means of a ball joint.

BRIEF DESCRIPTION OF THE DRAWINGS

The invention will now be explained in more detail with reference to the accompanying drawings, in which:

FIG. 2 shows the same mounting plate members as indicated in FIG. 1, but now in the position in which they are mounted in larger mirrors; while

In the Figures similar parts are indicated by the same reference numerals.

DETAIL DESCRIPTION OF THE DRAWINGS

Figure 1:
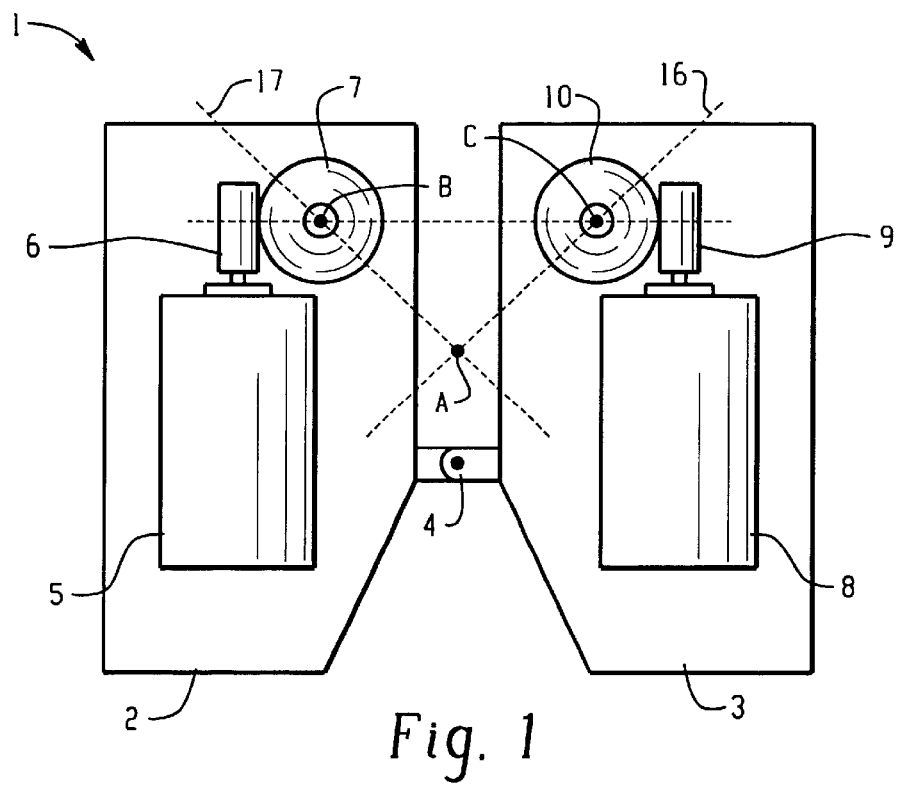
FIG. 1 shows the mounting plate members according to the invention in the position in which they are mounted in smaller mirrors.
Figure 2:
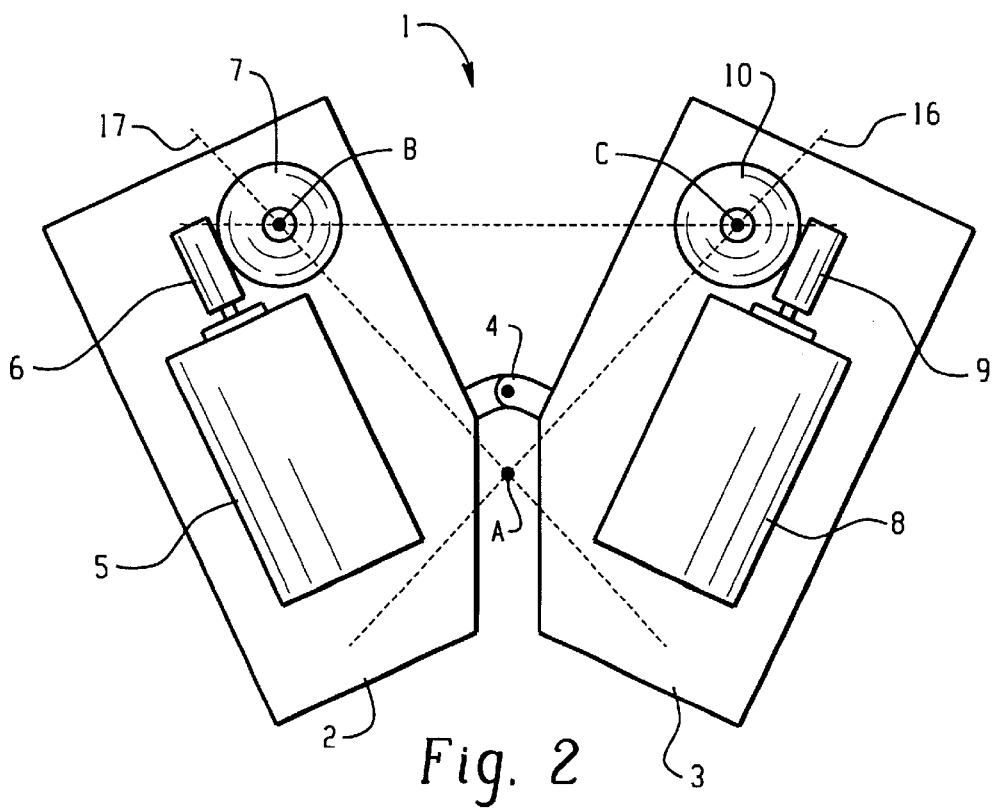
Figure 3:
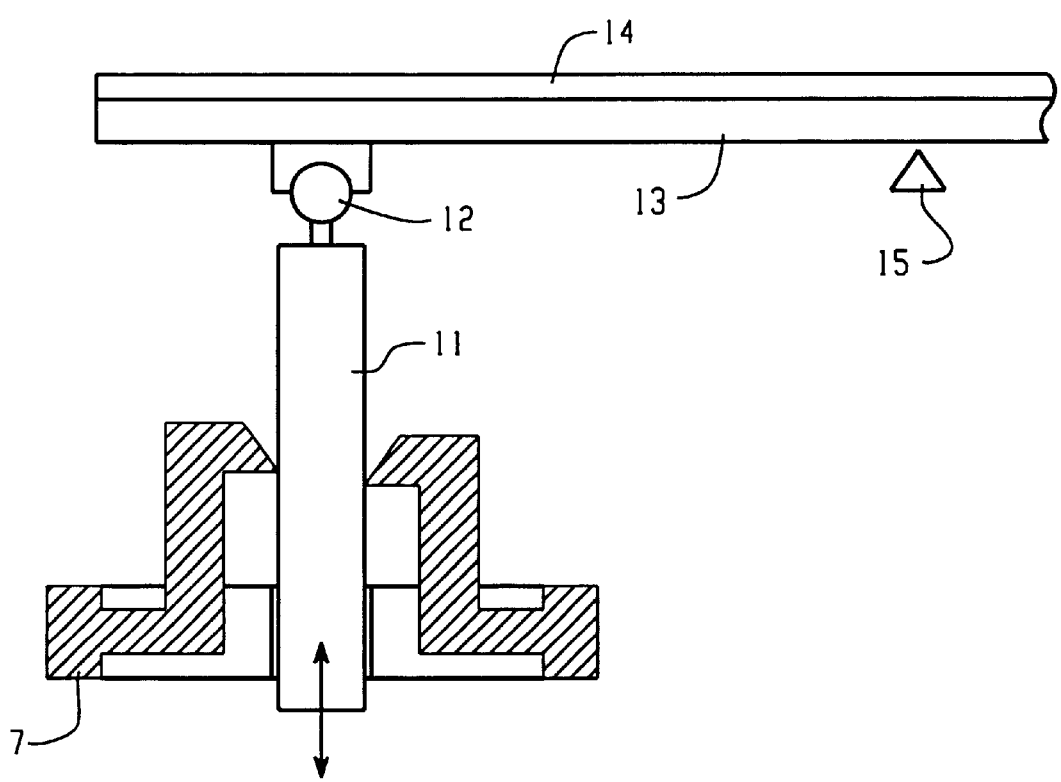
FIG. 3 shows a mode of application of one of the adjusting means on the mirror element.

FIGS. 1 and 2 show a mounting plate 1 composed of two mounting plate members 2 and 3. These mounting plate members are connected together by a pivot 4 for movement relative to each other in the plane of the mounting plate 1. Arranged on the mounting plate member 2 are a motor 5 with a worm 6 to be driven by this motor 5 and a worm wheel 7 gearing with this worm 6. Similarly, a motor 8 with a worm 9 to be driven by this motor 8 and a worm wheel 10 gearing with this worm 9 are arranged on the mounting plate member 3. The mounting plate members 2 and 3 and the components arranged thereon are mirror symmetric. The worm wheel 7 can move a screw spindle 11 (see FIG. 3) in its longitudinal direction, perpendicularly to a relevant mounting plate member, linearly to and fro, depending on the direction of rotation of the motor 5. Similarly, the worm wheel 10 can analogously move a screw spindle, not shown, to and fro, depending on the direction of rotation of the motor 8. Arranged at corresponding ends of each screw spindle is a ball joint, by means of which the screw spindles are connected to a supporting plate 13. FIG. 3 only shows the ball joint 12 at the end of the screw spindle 11. Arranged on this supporting plate 13 is a mirror element 14 in the form of a mirror layer covering the supporting plate at least partly. The supporting late 13 with the mirror element 14 is arranged for pivoting at a pivoting point 15 about two substantially mutually perpendicular axes in the housing of a rear-view mirror or wing mirror to be secured in or to a motor vehicle. The ball joints and the pivoting point 15 are approximately in one plane. Since such a pivoting arrangement of a supporting plate with a mirror element in a mirror housing is known per se, this need not be considered here in more detail. The projection of the pivoting point in the plane of the mounting plate 1 is indicated in FIGS. 1 and 2 by the letter A. Behind the supporting plate with the mirror element the mounting plate 1 is arranged in the housing of a rear-view mirror or wing mirror parallel to the supporting plate with the mirror element, so that, when the motor 5 is activated, the screw spindle 11 driven by the worm wheel 7 causes the supporting plate 13 with the mirror element 14 to tilt about one of the axes, namely about the axis, the projection of which in the plane of the mounting plate 1 is indicated by reference numeral 16, while, when the motor 8 is activated, the screw spindle driven by the worm wheel 10 causes the supporting plate 13 with the mirror element 14 to tilt about the other of the axes, namely about the axis, the projection of which in the plane of the mounting plate is indicated by reference numeral 17. Each of the adjusting means for pivoting the supporting plate with the mirror element about one of the axes is therefore formed by a motor 5 or 8, a worm 6 or 9, a worm wheel 7 or 10 and screw spindles driven by the respective worm wheels. The axes are substantially perpendicular to each other, so that pivoting the supporting plate with the mirror element about one axis does not affect the position of the supporting plate with the mirror element relative to the other axis. Owing to the fact that in the mirror housing the mounting plate 1 is arranged parallel to the supporting plate with the mirror element, the projections 16 and 17 of the axes on the plane of the mounting plate 1 are perpendicular to each other as well. Furthermore, the projections of the ball joints in the plane of the mounting plate 1 are indicated in FIGS. 1 and 2 by letters B and C. As a result of the mirror symmetric structure of the two mounting plate members 2 and 3 and the components arranged thereon, the triangle described by points A, B and C is an isosceles triangle with a top apex angle of 90°. The legs of this triangle, namely AB and AC, depend on the size of the mirrors in which the mounting plate 1 is to be arranged. In order to promote as much as possible the strength and stability of the attachment of the supporting plate with the mirror element in the mirror housing, the length of the legs will be chosen as great as possible. In the position shown in FIG. 1 of the mounting plate members 2 and 3 relative to each other, these plate members are arranged parallel to each other. By arranging the two plate, members in the mirror housing in this position, the legs AB and AC are kept relatively short. In this position of the mounting plate members relative to each other they are also used in relatively small mirror housings, e.g. in mirrors for passenger cars. By pivoting the two mounting plate members relative to each other by means of the pivot 4, as shown in FIG. 2, the legs AB and AC become longer, so that in this position relative to each other the mounting plate members are suitable for use in relatively large mirror housings, e.g. in mirrors for trucks. In other words, using a mounting plate 1 consisting of two parts 2 and 3 connected for movement relative to each other in the plane of the mounting plate 1, each of the adjusting means 5, 6, 7, 11 or 8, 9, 10 and associated screw spindle is arranged on a relevant mounting plate member 2, 3, whereafter, depending on the desired distance between the intersection of the two mutually perpendicular axes and the points of application of the adjusting means on the mirror element 14, the two mounting plate members 2, 3 are positioned relative to each other and are mounted in the housing of the mirror in the relative position they have thus assumed.

The invention is not limited to the practical example shown in the Figures and described, but comprises all kinds of modifications, of course as far as they fall within the scope of protection of the following claims. As already indicated, the worm and worm wheel combination may be replaced by other gear wheel transmissions and instead of a screw spindle a gear rack may be used. Furthermore, the legs AB and AC need not be equal to each other, instead of the ball joints other structures pivoting in every direction may be used, the screw spindles need not extend perpendicularly to the mounting plate members in the direction of the supporting surface with the mirror element, instead of the pivot 4 all types of other pivoting and deformable structures may be used, such as a fixed connection which softens under the influence of an elevated temperature to the extent that the two mounting plate members can be folded from the position shown in FIG. 1 into the position shown in FIG. 2 etc. In the practical example described, two mirror housing sizes have been started from, in which the mounting plate members can assume a position as indicated in FIGS. 1 and 2. However, the mounting plate members may also assume several positions relative to each other. If three or even four mirror housing sizes are available, then it will be favorable if the mounting plate members can also assume three or four positions relative to each other. It is further observed that the adjusting means on the two mounting plate members can be made suitable for manual operation. It is sufficient then to provide only a relevant manually operated screw spindle on each of the mounting plate members or to incorporate a possibility of disengaging from the relevant motor with transmission means relative to the relevant screw spindle, so that the screw spindles can be both manually operated and motor-driven, as desired.

What is claimed is:

1. A method for mounting first and second adjusting means for pivoting a mirror element about two substantially mutually perpendicular axes in a housing of a mirror to be secured in or to a vehicle, characterized in that, using a mounting plate consisting of two parts connected for movement relative to each other in the plane of the mounting plate, each of the adjusting means is arranged on a relevant mounting plate member, whereafter, depending on the desired distance between the intersection of the two mutually perpendicular axes and the points of application of the adjusting means on the mirror element, the two mounting plate members are positioned relative to each other and, in the relative position they have thus assumed, are mounted in the housing of the mirror.

2. A mounting plate used for carrying out the method according to claim 1, characterized in that it consists of two parts connected for movement relative to each other in the plane of the mounting plate, on which parts respectively first and second adjusting means are arranged for pivoting a mirror element about two substantially mutually perpendicular axes in a housing of a mirror to be secured in or to a vehicle.

3. A mounting plate according to claim 2, characterized in that a motor with associated transmission means is arranged on each mounting plate member, by means of which transmission means a control element can be moved linearly in a direction towards or away from the mounting plate member, the end of which control element, when the mounting plate and the mirror element are arranged in the housing of the mirror, acts on the mirror element.

4. A mounting plate according to claim 3, characterized in that the control element is formed by a screw spindle and each of the transmission means is formed by a worm to be driven by a relevant motor and a worm wheel gearing therewith and moving the screw spindle linearly.

5. A mounting plate according to any one of claims 2–4, characterized in that the two mounting plate members are connected together by a deformable connecting piece.

6. A mounting plate according to any one of claims 2–4, characterized in that the two mounting plate members are connected together by a loose joint.

7. A mirror for a vehicle, comprising a housing to be secured in or to the vehicle, a mirror element arranged therein for pivoting about two substantially mutually perpendicular axes and adjusting means arranged in the housing on a mounting plate, which adjusting means comprise a motor with associated transmission means for pivoting the mirror element about each of the axes, characterized in that the mounting plate consists of two parts connected for movement relative to each other in the plane of the mounting plate, on each part of which is arranged a motor with associated transmission means, the position of the mounting plates relative to each other being determined by the size of the housing of the mirror and the size of the mirror element.

8. A mirror according to claim 7, characterized in that the mirror element comprises a supporting plate arranged in the housing for pivoting about two substantially mutually perpendicular axes and each of the transmission means comprises a worm to be driven by a relevant motor, as well as a worm wheel gearing with this worm, by which a screw spindle can be moved linearly in a direction towards or away from the mounting plate member, the end of which screw spindle is connected with the supporting plate by means of a ball joint.

* * * * *